Aug. 8, 1967  R. L. DREYFUS  3,334,737
SPECIAL PACKAGE
Original Filed May 31, 1960

INVENTOR
ROBERT L. DREYFUS
BY C. E. Parker
ATTORNEY

United States Patent Office 3,334,737
Patented Aug. 8, 1967

3,334,737
SPECIAL PACKAGE
Robert L. Dreyfus, Greenville, S.C., assignor to
W. R. Grace & Co., Cambridge, Mass., a corporation of Connecticut
Original application May 31, 1960, Ser. No. 32,928, now Patent No. 3,187,477. Divided and this application Dec. 31, 1962, Ser. No. 248,721
3 Claims. (Cl. 206—65)

This application is a division of my prior copending application Ser. No. 32,928, filed May 31, 1960, and now Patent No. 3,187,477.

The present invention relates to a novel method of packaging articles, and, more specifically, to an improved method utilizing a heat shrinkable, thermoplastic, oriented film to provide a protective covering for articles. The invention also relates to a novel package resulting from utilization of the improved method.

The use of thin plastic films for providing protective coverings and/or packaging of articles has become quite popular in recent years. However, the methods and materials heretofore used have not been entirely satisfactory for commercial use. The prior practice has been generally to wrap articles in a plastic material which stretches when wet and shrinks when it dries or to dip the articles into a plastic in liquid form to provide a tight covering or package. These prior methods have proved expensive and impractical in many instances in that the resulting covering was not strong enough or tight enough. Some efforts have been made to use plastic materials having heat shrinkable properties, but these materials normally became tacky when heated as they did not have sufficient shrinkability below their plasticizing temperature to provide a tight package or covering. In addition, such heat shrinkable material had a tendency to lose its tear strength when heated and then cooled and, thus, did not provide a sufficiently strong, tough, tight package.

An object of the present invention is to provide a method of packaging a group of articles in a covering made from oriented, heat shrinkable, thermoplastic film.

It is a further object of the present invention to provide a method of packaging a group of articles in a continuous strip or tube in which each article is spaced apart from other articles within the package.

Another object of the present invention is to provide an inexpensive commercial package wrapped in a transparent, tough film.

Still a further object of the present invention is to provide a package for a plurality of articles which package is in the form of a strip or tube and in which the articles are spaced apart and prevented from coming in contact with other articles in the strip.

Figure 1:
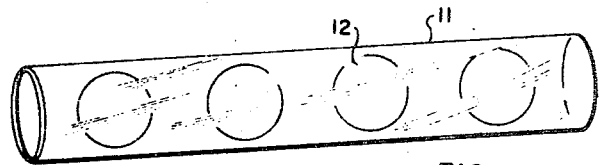

These and other objects of the present invention will appear more fully in the following specification and claims taken in conjunction with the accompanying drawings in which:

FIGURE 1 is a perspective view showing a plurality of articles within a loosely applied tube or envelope of heat shrinkable, oriented, thermoplastic film.

Figure 2:
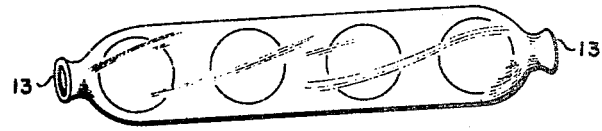

FIGURE 2 discloses a perspective view of a further step in the method of providing the finished covering for the plurality of articles.

Figure 3:

FIGURE 3 illustrates the finished package resulting from the method of the present invention.

The preferred heat shrinkable polymer is an irradiated, biaxially oriented polyethylene film having a shrink energy of at least 150 p.s.i. in both directions at 96° C. The polyethylene was prepared by irradiating Alathon 14 (a high pressure, branch chained polyethylene, molecular weight about 20,000, density 0.916) to a dosage of 12 megarads. The film was biaxially oriented by being stretched 350% in both directions.

In general there is employed in the invention polyethylene film or tubing which has been irradiated to an extent of 2 to 100 megarads, preferably 6 to 20 megarads. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van de Graaff electron generator.

In addition to the use of electrons for irradiating the polyethylene, there can be employed any of the irradiation procedures disclosed in Baird et al. application Ser. No. 713,848, filed Feb. 7, 1958 (now U.S. Patent 3,022,543), or Rainer et al. Patent 2,877,500. The disclosures of the Baird et al. application and Rainer et al. patent are hereby incorporated by reference.

If the film is biaxially oriented it can normally be carried out to an extent of 100 to 700% longitudinally and 100 to 900% laterally. The biaxial stretching can be carried out by trapping a bubble of air within heated, irradiated polyethylene tubing as disclosed in the Baird et al. application. The biaxially oriented polyethylene prepared by such a procedure has a high shrink energy, e.g. 100 to 500 p.s.i. at 96° C. It will be obvious to one skilled in the art that if it is desired to monoaxially orient the film, it can be done either laterally or longitudinally of the film.

There can be employed as a starting polyethylene for the irradiation procedure high, low, or medium density polyethylene prepared by low or high pressure technique. The starting polyethylene can have a molecular weight of 7,000 or 12,000 or 14,000 or 21,000 or 35,000 or even higher.

In place of the irradiated polyethylene, there can be employed irradiated or non-irradiated polypropylene. The polyethylene or polypropylene films must in either case be monoaxially or biaxially oriented.

Other films may be employed in the practice of the instant invention, e.g. polyvinyl chloride.

FIGURE 1 discloses an envelope or tubing made of irradiated, high shrink energy, biaxially oriented polyethylene 11 which is open at both ends. A plurality of articles 12, such as apples, are placed in the tube in linear fashion. An excess of film extends beyond the enclosed articles at both ends of the tube which is sufficiently long so that the articles may be spaced a distance of from 1 to 2 inches from each other within the tube. Heat is applied to both ends of the tube causing a reduction of the diameter of the ends 13 of the tube thereby entrapping the articles within said tube. The articles within the tube are then spaced apart and heat applied to that portion of the tube between the articles causing a reduction or constriction of the tube diameter between said articles thereby serving to encase the articles. The ends of the tube may be left open so that air can freely circulate within the tube.

The shrinking of the oriented film is accomplished by the application of heat to the oriented film. Hot air from a hot air blower is the preferred source of heat, but it is also possible to use heated metal surfaces to shrink the tubing.

This invention also encompasses the use of a flat sheet of film in place of the tube of film disclosed in the preceding example. The film is folded in the form of a tube with articles to be packaged spaced within. In shrinking the ends of the thus-formed roll or tube of film and the film between the spaced articles, it will be observed that the overlapping sides of the film will be held together by the binding effect of the shrunk portions of the film alone. It is not necessary to otherwise fasten or seal the overlapping edges of film to form a tube.

The package produced by the present invention is particularly suitable for wrapping articles which are inspected and handled by purchasers and which are easily bruised by handling. This package makes it possible to retail products vertically by hanging from a suitable support thereby taking up less floor space or the package may be wound about a reel so that the product could be dispensed from a roll. Any desired number of articles may be separated from the package merely by cutting between the articles in the region of reduced film diameter.

Fruits and vegetables may be advantageously packaged by this method. Apples and tomatoes are especially suitable since they are thin skinned and susceptible to bruising. It is obvious that articles other than food items may be similarly packaged.

The invention described in detail in the foregoing specification is susceptible to changes and modifications, both as to method and resulting articles without departing from the principle and spirit thereof. For this reason, the terminology used in the specification is for the purpose of description and not of limitation, the scope of the invention being defined in the claims.

Having described my invention what I claim as new and desire to secure by Letters Patent is:

1. Package comprising a plurality of articles spaced lengthwise within a tube of heat shrinkable film material, the end portions of said tube and each of the portions of said tube extending between adjacent articles being constricted in diameter due to heat shrinking thereof so as to maintain each of said plural articles permanently spaced apart from adjacent articles while the tube between said portions is not constricted and is not heat shrunk.

2. A package according to claim 1 wherein said heat shrinkable film is an oriented film made of a solid polymer of an olefin having 2 to 3 carbon atoms.

3. A package according to claim 1 wherein said heat shrinkable film is an irradiated, high shrink energy, biaxially oriented polyethylene.

References Cited
UNITED STATES PATENTS

| | | | |
|---|---|---|---|
| 614,002 | 11/1898 | Jenkins | 47—56 |
| 1,192,744 | 7/1916 | Brough. | |
| 1,782,526 | 11/1930 | Beardsley. | |
| 1,959,978 | 5/1934 | Freund | 99—176 |
| 2,255,810 | 9/1941 | Replogle | 99—175 X |
| 2,608,488 | 8/1952 | Rumsey | 99—176 |
| 2,877,500 | 3/1959 | Rainer et al. | |
| 2,878,928 | 3/1959 | Ivy. | |
| 2,956,672 | 10/1960 | Kirkpatrick. | |
| 3,022,543 | 2/1962 | Baird et al. | |
| 3,047,140 | 7/1962 | Robins. | |
| 3,093,448 | 6/1963 | Kirkpatrick et al. | |

THERON E. CONDON, *Primary Examiner.*

EARL J. DRUMMOND, GEORGE O. RALSTON, LOUIS G. MANCENE, *Examiners.*

J. M. CASKIE, *Assistant Examiner.*